US009957675B2

(12) United States Patent
Marsolek et al.

(10) Patent No.: US 9,957,675 B2
(45) Date of Patent: May 1, 2018

(54) COLD PLANER LOADING AND TRANSPORT CONTROL SYSTEM

(71) Applicant: Caterpillar Paving Products Inc., Brooklyn Park, MN (US)

(72) Inventors: John Lee Marsolek, Watertown, MN (US); Eric S. Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 289 days.

(21) Appl. No.: 14/796,988

(22) Filed: Jul. 10, 2015

(65) Prior Publication Data
US 2017/0009408 A1 Jan. 12, 2017

(51) Int. Cl.
E01C 23/088 (2006.01)
G05D 3/12 (2006.01)

(52) U.S. Cl.
CPC ............ *E01C 23/088* (2013.01); *G05D 3/12* (2013.01)

(58) Field of Classification Search
CPC ............................... E01C 23/088; G05D 3/12
See application file for complete search history.

(56) References Cited

U.S. PATENT DOCUMENTS

| 4,852,674 | A | 8/1989 | Gudat |
| 5,850,341 | A | 12/1998 | Fournier et al. |
| 8,296,019 | B2 | 10/2012 | Kendrick |
| 8,363,210 | B2 | 1/2013 | Montgomery |
| 8,528,988 | B2 | 9/2013 | Von Schöebeck et al. |
| 9,522,415 | B2 * | 12/2016 | Bamber |
| 9,562,334 | B2 * | 2/2017 | von der Lippe ...... E01C 23/088 |
| 2008/0153402 | A1 | 6/2008 | Arcona et al. |
| 2011/0080034 | A1 * | 4/2011 | Schonebeck .......... E01C 23/088 299/1.5 |
| 2012/0104828 | A1 * | 5/2012 | Grathwol .............. E01C 23/088 299/1.5 |
| 2013/0076101 | A1 | 3/2013 | Simon |
| 2013/0080000 | A1 | 3/2013 | Von der Lippe et al. |
| 2014/0097665 | A1 | 4/2014 | Pauisen et al. |
| 2014/0244208 | A1 | 8/2014 | Paulsen et al. |

FOREIGN PATENT DOCUMENTS

DE 10 2013 004 995 A1 9/2014
WO WO 2015/034497 A1 3/2015

OTHER PUBLICATIONS

Pending U.S. Appl. No. 14/722,231, by Eric S. Engelmann et al., "Cold Planer Having Transport Payload Monitoring System"; filed May 27, 2015.

* cited by examiner

Primary Examiner — Sunil Singh
(74) Attorney, Agent, or Firm — Finnegan, Henderson, Farabow, Garrett & Dunner, LLP

(57) ABSTRACT

A control system for a cold planer having a conveyor configured to transfer material into a first receptacle is disclosed. The control system may include a first sensor configured to generate a first signal indicative of an amount of material being transferred into the first receptacle, a communication device configured to transfer information between the cold planer and the first receptacle, and a controller electronically connected to the first sensor and the communication device. The controller may be configured to receive an input from the first receptacle via the communication device and determine a fill level of the first receptacle based on the first signal and the input from the first receptacle.

20 Claims, 3 Drawing Sheets

COLD PLANER LOADING AND TRANSPORT CONTROL SYSTEM

TECHNICAL FIELD

The present disclosure relates generally to a control system and, more particularly, to a loading and transport control system for a cold planer.

BACKGROUND

Asphalt-surfaced roadways are built to facilitate vehicular travel. Depending upon usage density, base conditions, temperature variation, moisture levels, and/or physical age, the surfaces of the roadways eventually become misshapen and unable to support wheel loads. In order to rehabilitate the roadways for continued vehicular use, spent asphalt is removed in preparation for resurfacing.

Cold planers, sometimes also called road mills or scarifiers, are used to break up and remove layers of an asphalt roadway. A cold planer typically includes a frame propelled by tracked or wheeled drive units. The frame supports an engine, an operator's station, a milling drum, and conveyors. The milling drum, fitted with cutting tools, is rotated through a suitable interface with the engine to break up the surface of the roadway. The broken up roadway material is deposited by the milling drum onto the conveyors, which transfer the broken up material into haul trucks for removal from the worksite. As haul trucks are filled, they are replaced with empty haul trucks. The filled trucks transport the broken up material to a different location to be reused as aggregate in new asphalt or otherwise recycled. This transport process repeats until the milling process is finished.

Operators may wish to fill each truck to an optimum capacity before replacing it with an empty truck, while also ensuring that the filling and truck replacement processes are efficient and continuous. The filling process typically relies on constant communication between operators of the cold planer and the truck to ensure that the truck is properly aligned with the conveyor of the cold planer in order to avoid spillage of material and ensure that the material is evenly distributed within the truck. The truck replacement process also relies on communication between the cold planer and truck operators to convey when the current truck is full and when the next truck will arrive. Operators typically use hand signals and horns to convey information, such as when to speed up, slow down, stop, and when the truck is full. However, these methods of communication can be imprecise, misinterpreted, and unable to convey other important and more complex information.

One attempt to control the loading of milled material into a transport vehicle is disclosed in U.S. Patent Application Publication No. 2013/0080000 A1 of Von der Lippe et al. that published on Mar. 28, 2013 ("the '000 publication"). In particular, the '000 publication discloses a system for determining a fill level of the transport vehicle, determining the relative positioning of a milling machine and the transport vehicle, and signaling instructions to the operator of the transport vehicle to maintain proper positioning of the vehicle relative to the milling machine. The system includes a camera that detects material loading within the transport vehicle and the distance between the transport vehicle and the milling machine. A controller uses data from the camera to generate signals for instructing the operator of the transport vehicle to control the vehicle's speed with respect to the milling machine. When the transport vehicle is full, the controller generates a signal instructing the operator to depart from the milling machine. Signals are communicated to the operator of the transport vehicle via a visual display and an acoustic device.

While the system of the '000 publication may allow for some control of the loading process, it may not be optimum. In particular, the system of the '000 publication may only convey speed and departure instructions to the operator of the transport vehicle, and it may not communicate other important information between the milling machine and transport vehicles.

The control system of the present disclosure solves one or more of the problems set forth above and/or other problems in the art.

SUMMARY

In one aspect, the present disclosure is related to a control system for a cold planer having a conveyor configured to transfer material into a first receptacle. The control system may include a first sensor configured to generate a first signal indicative of an amount of material being transferred into the first receptacle, a communication device configured to transfer information between the cold planer and the first receptacle, and a controller electronically connected to the first sensor and the communication device. The controller may be configured to receive an input from the first receptacle via the communication device and determine a fill level of the first receptacle based on the first signal and the input from the first receptacle.

In another aspect, the present disclosure is related to a method of operating a cold planer. The method may include transferring material into a first receptacle via a conveyor, determining an amount of material being transferred into the first receptacle, and receiving an input from the first receptacle. The method may further include determine a fill level of the first receptacle based on the amount of material being transferred into the first receptacle and the input from the first receptacle.

In yet another aspect, the present disclosure is directed to a cold planer. The cold planer may include a frame, a milling drum connected to the frame, a conveyor pivotally connected to the frame and configured to load milled material into a first receptacle, and a first sensor configured to generate a first signal indicative of an amount of material being transferred into the first receptacle. The cold planer may further include a second sensor configured to generate a second signal indicative of a position of the conveyor with respect to the first receptacle, a communication device configured to transfer information between the cold planer and the first receptacle and between the cold planer and a second receptacle, and a controller electronically connected to the first sensor, the second sensor, and the communication device. The controller may be configured to receive an input from the first receptacle via the communication device, generate a command to adjust the position of the conveyor with respect to the first receptacle based on the first and second signals and the input from the first receptacle, determine a fill level of the first receptacle based on the first signal and the input from the first receptacle, and generate a dispatch signal when the fill level of the first receptacle exceeds a threshold.

DETAILED DESCRIPTION

For the purpose of this disclosure, the term "asphalt" is defined as a mixture of aggregate and asphalt cement. Asphalt cement is a brownish-black solid or semi-solid mixture of bitumens obtained as a byproduct of petroleum distillation. The asphalt cement can be heated and mixed with the aggregate for use in paving roadway surfaces, where the mixture hardens upon cooling. A "cold planer" is defined as a machine used to remove layers of hardened asphalt from an existing roadway. It is contemplated that the disclosed cold planer may also or alternatively be used to remove cement and other roadway surfaces, or to remove non-roadway surface material such as in a mining operation.

Figure 1:
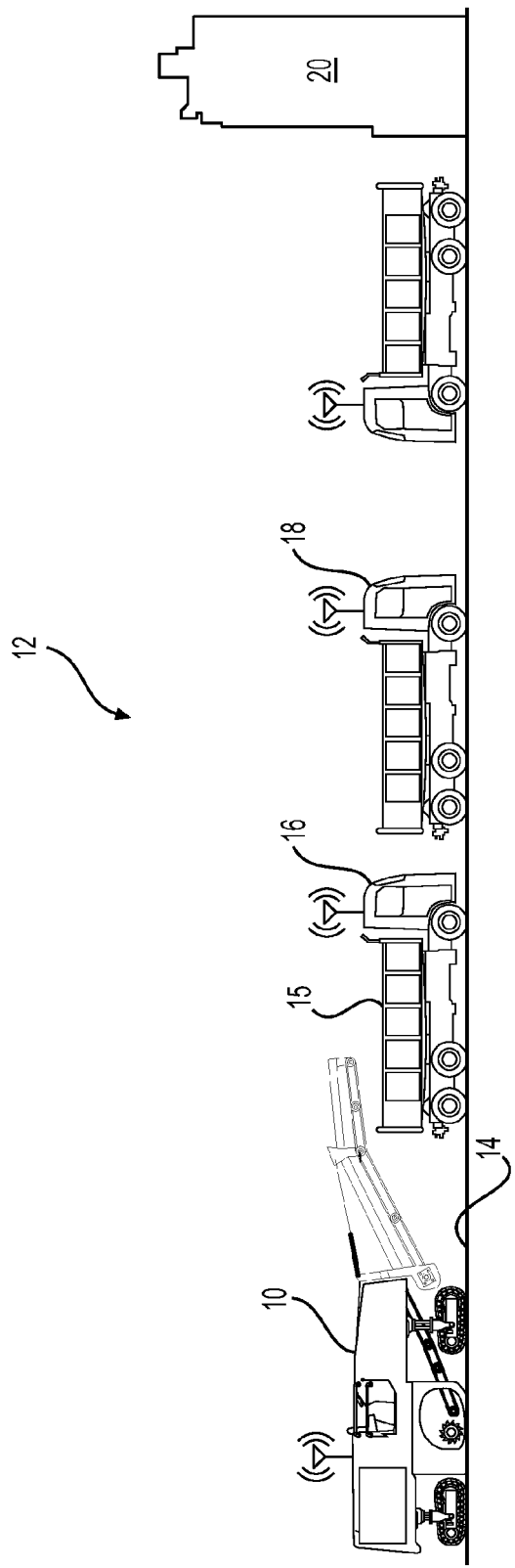
FIG. 1 is a cutaway view illustration of an exemplary disclosed cold planer.

FIG. 1 shows a cold planer 10 employed at a worksite 12, such as, for example, a roadway milling operation. As part of the milling operation, cold planer 10 may mill a surface 14 of the roadway and transfer milled material into a bed 15 of a first transport vehicle ("transport vehicle") 16. A second transport vehicle 18 may be positioned nearby cold planer 10, summoned from a dispatch facility, or returning from a material storage site 20 as transport vehicle 16 is being filled. When full, transport vehicle 16 may depart from cold planer 10 to deliver the milled material to the storage site 20, and second transport vehicle 18 may approach cold planer 10 to replace transport vehicle 16 so the milling operation may continue.

Figure 2:
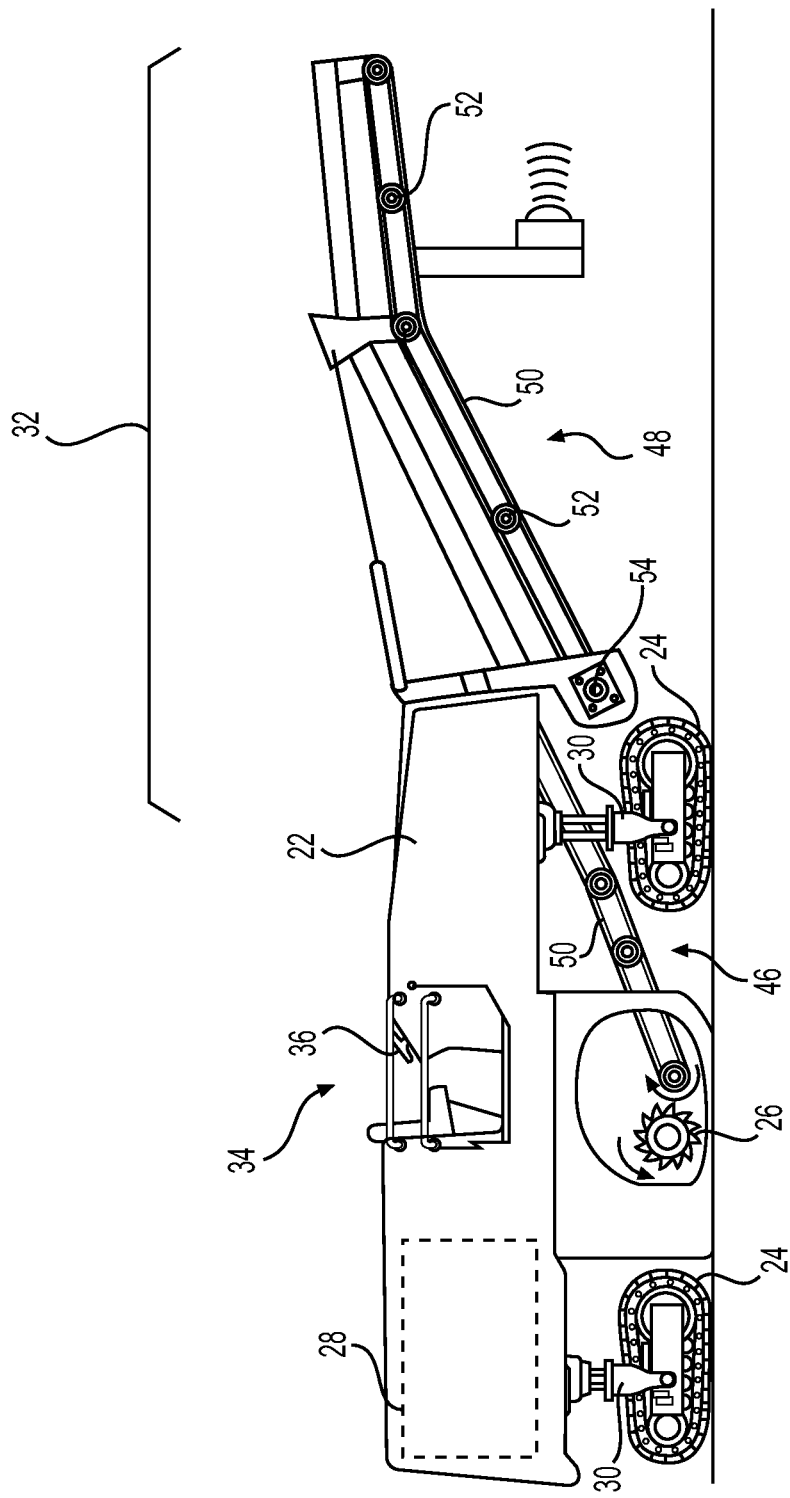
FIG. 2 is a perspective illustration of an exemplary disclosed conveyor that may be used with the cold planer of FIG. 2.

FIG. 2 illustrates an exemplary cold planer 10 having a frame 22 supported by one or more traction devices 24, a milling drum 26 rotationally supported under a belly of frame 22, and an engine 28 mounted to frame 22 and configured to drive milling drum 26 and traction devices 24. Traction devices 24 may include either wheels or tracks connected to actuators 30 that are adapted to controllably raise and lower frame 22 relative to a ground surface. It should be noted that, in the disclosed embodiment, raising and lowering of frame 22 may also function to vary a milling depth of milling drum 26 into surface 14. In some embodiments, the same or different actuators 30 may also be used to steer cold planer 10 and or to adjust a travel speed of traction devices 24 (e.g., to speed up or brake traction devices 24), if desired. A conveyor system 32 may be pivotally connected at a leading end to frame 22 and configured to transport material away from milling drum 26 and into a receptacle, such as transport vehicle 16 (referring to FIG. 1). Other types of receptacles may be used, if desired.

Frame 22 may also support an operator station 34. Operator station 34 may house any number of interface devices 36 used to control cold planer 10. In the disclosed example, interface devices 36 may include, among other things, a display 38, a warning device 40, and an input device 42 (38-42 shown only in FIG. 3). In other embodiments, operator station 34 may be offboard cold planer 10. For example, operator station 34 may embody a remote control, such as a handheld controller, that an operator may use to control cold planer 10 from anywhere on worksite 12. Operator station 34 may alternatively embody a software program and user interface for a computer, and may include a combination of hardware and software. In other embodiments, cold planer 10 may be autonomous and may not include operator station 34.

Display 38 may be configured to render the location of cold planer 10 (e.g., of milling drum 26) relative to features of the jobsite (e.g., milled and/or unmilled parts of surface 14), and to display data and/or other information to the operator. Warning device 40 may be configured to audibly and/or visually alert the operator of cold planer 10 as to a proximity of milling drum 26 to the worksite features, and/or when certain pieces of data exceed an associated threshold. Input device 42 may be configured to receive data and/or control instructions from the operator of cold planer 10. Other interface devices (e.g., control devices) may also be possible, and one or more of the interface devices described above could be combined into a single interface device, if desired.

Input device 42 may be, for example, an analog input device that receives control instructions via one or more buttons, switches, dials, levers, etc. Input device 42 may also or alternatively include digital components, such as one or more soft keys, touch screens, and/or visual displays. Input device 42 may be configured to generate one or more signals indicative of various parameters associated with cold planer 10 and/or its surrounding environment based on input received from the operator.

In one embodiment, input device 42 may be configured to receive an operator selection indicative of a type or condition of the receptacle in which milled material is being deposited. For example, the operator may select transport vehicle 16 from a list of different types of transport vehicles and/or other types of partially mobile or stationary receptacles. In some embodiments, each receptacle may have an associated identification ("ID") number, which may be entered manually by the operator into input device 42 to access information about transport vehicle 16. Each receptacle may have a profile associated with its ID number, which may contain various pieces of data. For example, each profile may include a predetermined volumetric capacity, dimensions (e.g., length, width, height, etc.), shape or image, tare weight, weight limit $W_L$, desired payload (e.g., target fill level, weight, volume, etc.), and/or other parameters associated with each specific receptacle or type of receptacle.

Input device 42 may also or alternatively be configured to allow the operator to manually enter specific pieces of data, such as the volumetric capacity, shape, weight limit $W_L$, tare weight, and/or other parameters associated with a receptacle. Input device 42 may also be configured to allow the operator to indicate when a receptacle is empty and/or ready to be filled. For example, the operator may press a button or actuate another feature of input device 42 when an empty receptacle, such as second transport vehicle 18 (referring to FIG. 1) has arrived and is ready to be filled after transport vehicle 16 has been filled and/or has departed. The receptacle information may be sent to and/or stored in a controller 44 (referring to FIG. 3) and used for further processing.

Conveyor system 32 may include a first conveyor 46 adjacent milling drum 26 that is configured to transfer milled material to a second conveyor 48. Conveyor 48 may be pivotally attached to frame 22 so that the height at which milled material leaves conveyor 48 can be adjusted. That is, a pivotal orientation of conveyor 48 in the vertical direction may be adjusted to raise and lower conveyor 48. Conveyor 48 may also be pivotally attached to frame 22 so that the lateral location at which milled material leaves conveyor 48 may be adjusted. That is, a pivotal orientation of conveyor 48 in the horizontal direction may be adjusted to move conveyor 48 from side to side.

Conveyors 46 and 48 may each include a belt 50 that is supported on a plurality of roller assemblies 52 and driven by a motor 54. Motor 54 may embody, for example, a hydraulic motor 54 powered by a hydraulic system (not shown). In other embodiments, motor 54 may be an electric motor or another type of motor. Motor 54 may be powered by engine 28 or by another power source.

Figure 3:
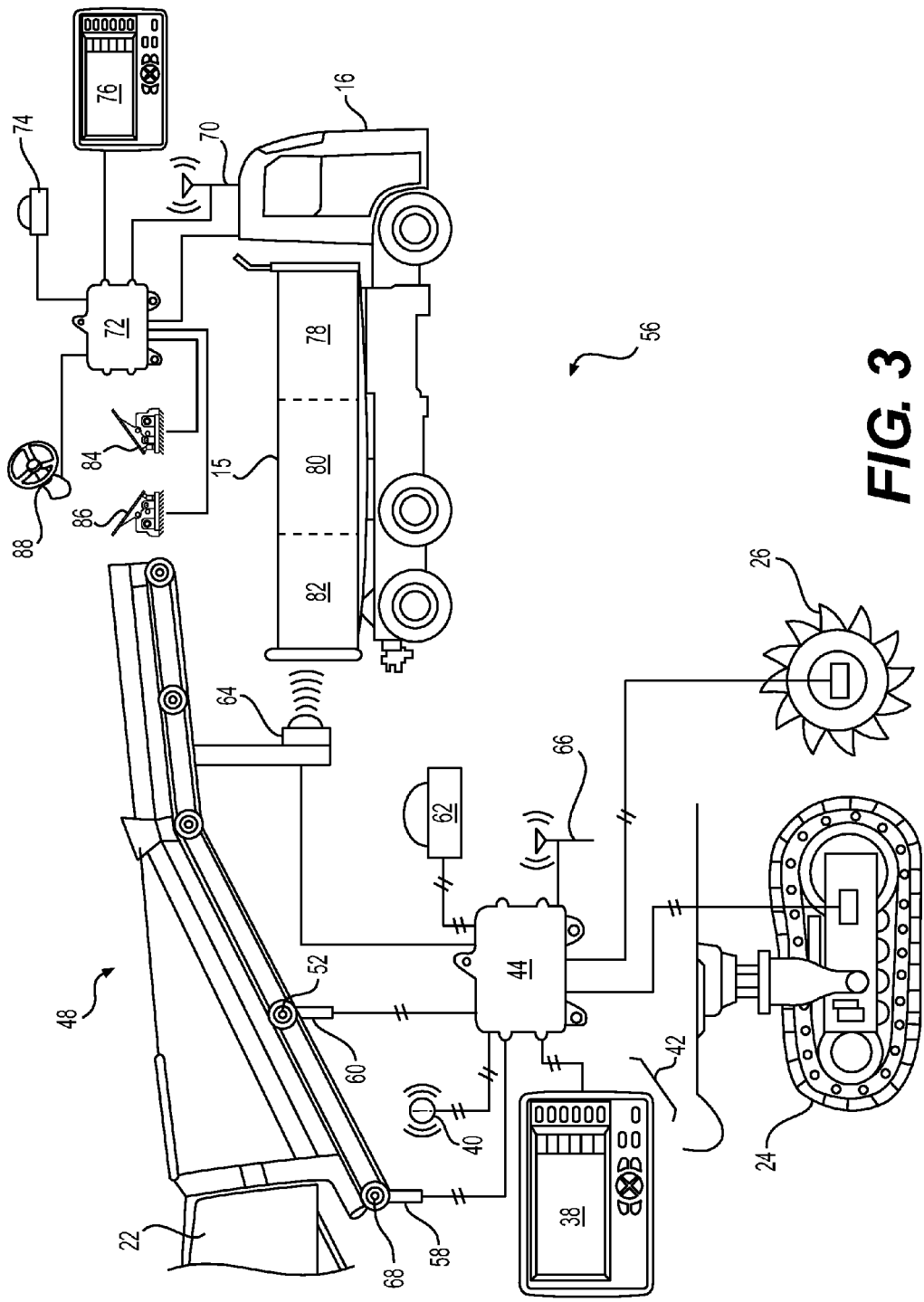
FIG. 3 is a diagrammatic illustration of an exemplary disclosed yield measurement system that may be used with the cold planer of FIG. 1.

As illustrated in FIG. 3, a loading and transport control system 56 ("control system") may be associated with cold planer 10 and include elements that cooperate to monitor and analyze material transfer into transport vehicle 16 and facilitate communication between cold planer 10 and transport vehicles 16, 18. For example, elements of control system 56 may cooperate to determine a mass flow rate $\dot{m}$ and/or a volume flow rate $\dot{V}$ of milled material being discharged by cold planer 10 into transport vehicle 16, a total weight $W_m$ ("weight") of milled material that has been transferred, a fill level $\Sigma$ of transport vehicle 16, an amount of remaining time $T_F$ until first transport vehicle 16 is full, and/or other statistical information. Elements of control system 56 may include interface devices 36, a speed sensor 58, a material measurement sensor 60 ("sensor"), a locating device 62, a position sensor 64, a communication device 66, and controller 44 electronically connected with each of the other elements. Information, including the mass flow rate $\dot{m}$, volume flow rate $\dot{V}$, weight $W_m$, fill level $\Sigma$, and remaining time $T_F$ may be shown to the operator of cold planer 10 via display 38 and used by the operator and/or controller 44 to regulate operating parameters of cold planer 10 (e.g., travel speed, drum rotational speed, milling depth, etc.) and/or to dispatch transport vehicles 16, 18. This information and/or other data may be sent offboard cold planer 10 via communication device 66 for use by operators of transport vehicles 16, 18, jobsite management, and/or for back office analysis.

Speed sensor 58 may be configured to generate a signal indicative of a linear belt speed of belt 50. For example, speed sensor 58 may be a shaft-driven sensor that is attached to a pulley 68 of conveyor system 32. Pulley 68 may be in contact with belt 50 and may be driven by motor 54 (referring to FIG. 2). Pulley 68 may alternatively be a free-wheeling pulley, such as an idler, tensioner, or other type of pulley. Speed sensor 58 may alternatively be attached directly to a shaft of motor 54, and its signal may also be indicative of the speed of motor 54. In some embodiments, multiple speed sensors 58 may be utilized and their outputs processed by controller 44 in order to reduce inaccuracies caused by slipping of belt 50. Speed sensor 58 may detect the speed of a shaft or wheel using magnetic, optical, pulsating, or other type of sensing element. Signals generated by speed sensor 58 may be communicated to controller 44 and used for further processing.

Sensor 60 may include one or more sensors and/or systems of sensors configured to generate a signal indicative of an amount of material being transferred into transport vehicle 16 via conveyor 48. In one embodiment, for example, sensor 60 may be a belt scale. That is, sensor 60 may include a force transducer that is configured to measure a normal force applied to belt 50 by the weight of material on conveyor 48. The signal generated by sensor 60 may be utilized by controller 44 in conjunction with the signal generated by speed sensor 58 and/or other sensors (e.g., an inclinometer) to determine the mass flow rate $\dot{m}$ and/or a volume flow rate $\dot{V}$ of milled material being transferred into transport vehicle 16.

In another embodiment, sensor 60 may generate a signal indicative of a power used to drive conveyor 48. For example, sensor 60 may be configured to measure a hydraulic pressure differential, electrical voltage, or other parameter of motor 54. The signal generated by sensor 60 may be utilized by controller 44 in conjunction with other parameters (e.g., hydraulic fluid flow rate, motor speed, motor displacement, electrical resistance, electrical current, etc.) to determine the power used to drive conveyor 48. The power used to drive conveyor 48, along with other parameters (e.g., the size and speed of pulley 68, angle of inclination of conveyor 48, etc.) may be utilized by controller 44 to determine the mass flow rate $\dot{m}$ and/or a volume flow rate $\dot{V}$ of milled material being transferred into transport vehicle 16.

Sensor 60 may alternatively embody other types of sensors that are configured to determine the amount of material being transferred by conveyor 48 without contacting any moving parts of conveyor 48. For example, sensor 60 may include a radioactive detection system, a laser scanning system, an optical scanner, a camera, and/or an ultrasonic sensor that is configured to generate a signal indicative of a volume V of material on conveyor 48. Other types of sensors or sensing systems may be used, if desired. Signals generated by such sensors may be utilized by controller 44 in conjunction with other parameters (e.g., belt speed) to determine the mass flow rate $\dot{m}$ and/or a volume flow rate $\dot{V}$ of milled material being transferred into transport vehicle 16.

Locating device 62 may be configured to generate a signal indicative of a geographical position of the cold planer 10 relative to a local reference point, a coordinate system associated with the work area, a coordinate system associated with Earth, or any other type of 2-D or 3-D coordinate system. For example, locating device 62 may embody an electronic receiver configured to communicate with one or more satellites, or a local radio or laser transmitting system used to determine a relative geographical location of itself. Locating device 62 may receive and analyze high-frequency, low-power radio or laser signals from multiple locations to triangulate a relative 3-D geographical position. A signal indicative of this geographical position may then be communicated from locating device 62 to controller 44.

The signal generated by locating device 62 may be combined with other information, such as known dimensions of cold planer 10, to determine the geographic position of certain components of cold planer 10 during operation. For example, a known offset between locating device 62 and a location on conveyor 48 (e.g., an end of conveyor 48) may be used to determine and/or monitor the location of conveyor 48 during a milling operation. This information may be utilized by controller 44 to determine the position of conveyor 48 with respect to other objects, such as transport vehicle 16. For example, this information may be used to determine a distance between conveyor 48 and transport vehicle 16, which may be used by controller 44 for further processing.

Position sensor 64 may be configured to generate a signal indicative of a distance between conveyor 48 and other objects, such as transport vehicle 16, by physically sensing the location of the other objects. For example, position sensor 64 may be an optical sensor, an ultrasonic sensor, a laser sensor, or another type of sensor that is configured to generate a signal indicative of a distance between another object and itself. Position sensor 64 may be mounted to conveyor 48 or at another location on cold planer 10 where it is able to detect objects in front of and/or to the side of conveyor 64.

The signal generated by position sensor 64 may be utilized by controller 44 to generate a quantitative and/or qualitative representation of the distance between conveyor 48 and transport vehicle 16. For example, the signal generated by position sensor 64 may be utilized to determine an actual distance between conveyor 48 and transport vehicle 16. The signal may also or alternatively be utilized by controller 44 to generate audible and/or visible indicia of distance, such as by varying sounds (e.g., beeps, tones, etc.) and/or lights (e.g., flashes, bars, colors, etc.). This information may be utilized by controller 44 to automatically maintain or allow operators to manually maintain a desired distance between conveyor 48 and transport vehicle 16. This distance may be controlled in order to ensure that transport vehicle 16 is properly loaded with milled material. This information may also be used by controller 44 to prevent unintended contact between cold planer 10 and transport vehicle 16, such as by notifying operators when transport vehicle 16 is within a threshold distance of conveyor 48.

Position sensor 64 may also be configured to generate signals indicative of distances between conveyor 48 and various features and/or parts of transport vehicle 16. That is, position sensor 64 may be configured to identify profiles, edges, and/or other features of transport vehicle 16, and generate a signal indicative of a distance between those features and a reference point, such as a center of sensor 64 or a location on conveyor 48. This information may be used during a milling operation to determine a position of conveyor 48 with respect to transport vehicle 16. For example, position sensor 64 may be configured to determine the distances between conveyor 48 and the lateral sides of transport vehicle 16 (e.g., left, right, front, back, etc.), and these distances may be utilized by controller 44 to ensure proper loading of transport vehicle 16 and prevent spillage of milled material.

Communication device 66 may include hardware and/or software that enables sending and receiving of data messages between controller 44 and an offboard entity. The data messages may be sent and received via a direct data link and/or a wireless communication link, as desired. The direct data link may include an Ethernet connection, a connected area network (CAN), or another data link known in the art. The wireless communications may include one or more of satellite, cellular, Bluetooth, WiFi, infrared, and any other type of wireless communications that enables communication device 66 to exchange information.

For example, communication device 66 may be configured to communicate with first transport vehicle 16 via a communication device 70 electronically connected to a controller 72 of transport vehicle 16. When cold planer 10 and first transport vehicle 16 are far from each other, data may be transferred between communication devices 66, 70 via a cellular network, satellite network, or other long-distance data network. Information from transport vehicle 16, such as a signal indicative of a geographic position generated by locating device 74, vehicle ID, and other desired information may be communicated over the long-distance network. When cold planer 10 and transport vehicle 16 are near each other, communication devices 66, 70 may automatically form a communication link via a short-distance network, such as a Bluetooth, infrared, WiFi, or other network for sharing greater amounts of data. The short-distance network may be more efficient and cost effective for transferring greater amounts of data during a milling operation than the long-distance network.

Controller 44 may be configured to receive inputs and other information from transport vehicle 16 via communication device 66. Such inputs may include for example, the vehicle ID and/or the associated profile of transport vehicle 16. In one embodiment, controller 44 may directly receive each piece of information in the associated profile of transport vehicle 16 via communication device 66. Such information may include, for example, a predetermined volumetric capacity, geometric dimensions (e.g., length, width, height, etc.), shape or image, tare weight, weight limit $W_L$, desired payload (e.g., target fill level, target weight, target volume, desired material, etc.), current fill level, and/or other parameters. In other embodiments, controller 44 may store the associated profile of any number of receptacles, such as transport vehicle 16, and reference them by ID so that only the ID and/or new information needs to be communicated via device 66 during the milling operation. Profile information may be periodically updated by connecting controller 44 to a server, a data bank, or a receptacle controller via communication device 66.

Using the input from transport vehicle 16 and other information, controller 44 may be configured to determine an amount of material being transferred into transport vehicle 16. For example, controller 44 may be configured to determine a mass flow rate $\dot{m}$ of milled material being transferred by conveyor 48 and to show the mass flow rate $\dot{m}$ and other information on display 38. Controller 44 may receive the signal from material measurement sensor 60 that is indicative of a force, pressure, volume, voltage, etc., and controller may determine the mass m of material on belt 50 based on the signal. Using the mass m in conjunction with other information (e.g., belt speed), controller 44 may be configured to determine the mass flow rate $\dot{m}$ of material being transferred by conveyor 48. Controller 44 may continually determine the mass flow rate $\dot{m}$ and determine the total weight $W_m$ of material that has been transferred by conveyor 48 into transport vehicle 16 over an elapsed period of conveying time based on the mass flow rate $\dot{m}$. The total weight $W_m$ of milled material may also or alternatively be determined based on the volume flow rate $\dot{V}$ and a known density of the milled material.

Controller 44 may be configured to determine a total weight $W_{total}$ and a fill level $\Sigma$ of transport vehicle 16 based on the mass flow rate $\dot{m}$, volume flow rate $\dot{V}$, and/or weight $W_m$ of the milled material and known features of transport vehicle 16 (e.g., geometry, volumetric capacity, shape, tare weight, weight limit $W_L$, etc.) received via communication device 66. Using this information and the signal from sensor 60, controller 44 may be configured to determine the remaining time $T_F$ until transport vehicle 16 is full (i.e., reaches a threshold, reaches a desired fill level, etc.). For example, controller 44 may compare the mass flow rate $\dot{m}$, volume flow rate $\dot{V}$, weight $W_m$, and/or fill level $\Sigma$ to the weight limit $W_L$, volumetric capacity, and/or target fill level of transport vehicle 16 over a period of conveying time, and determine how much time remains until transport vehicle will become full.

Controller 44 may be configured to show one or more of the fill level $\Sigma$, remaining time $T_F$ until transport vehicle 16 is full, volume flow rate $\dot{V}$, mass flow rate $\dot{m}$, weight $W_m$, total weight $W_{total}$ of transport vehicle 16, and/or other information to the operator of cold planer 10 via display 38. Controller 44 may also be configured to communicate this and other information via communication device 66 and show it to the operator of transport vehicle 16 via a display 76 located within an operator station of transport vehicle 16. In this way, operators of cold planer 10 and transport vehicle 16 may be able to monitor and control the filling process with the same information. It should be noted that controller 44 may also be configured to communicate this information to other receptacles and devices that are capable of receiving such information, such as second transport vehicle 18 (referring to FIG. 1) and back office computers.

Controller 44 may be configured to automatically control some aspects of cold planer 10 and the milling process. For example, controller 44 may be configured to automatically control operations of cold planer 10 based on the fill level Σ and/or total weight $W_{total}$ of transport vehicle 16. That is, controller 44 may monitor the fill level Σ and total weight $W_{total}$ of transport vehicle 16, and automatically slow or stop the movement of traction devices 24, milling drum 26, and/or conveyor system 32 as the fill level Σ approaches a threshold (e.g., 90% filled) or becomes full (e.g., 100% filled) or when the total weight $W_{total}$ reaches a threshold (e.g., a desired, legal, or other weight limit $W_L$). It is understood that other thresholds may be used, if desired.

When the threshold fill level Σ or total weight $W_{total}$ of first transport vehicle 16 has been reached or exceeded, first transport vehicle 16 may be full and ready to be replaced by second transport vehicle 18 (referring to FIG. 1). Before first transport vehicle 16 is full, but after the fill level Σ or total weight $W_{total}$ has exceeded an intermediate threshold, controller 44 may automatically generate a dispatch signal and communicate the signal to first transport vehicle 16 and/or another receptacle, such as second transport vehicle 18. The dispatch signal may be indicative of a request for first transport vehicle 16 to depart from cold planer 10 once transport vehicle is full. The dispatch signal may also or alternatively be indicative of a request for another receptacle to approach cold planer 10 to allow the milling process to continue.

For example, controller 44 may receive a location signal from second transport vehicle 18 and/or a number of other receptacles via communication device 66. Based on the location signals, controller 44 may determine the distance and/or time between each of the receptacles and cold planer 10, and communicate the dispatch signal to a receptacle that is able to arrive before the remaining time $T_F$ expires. In some situations, controller 44 may send the dispatch signal to the closest receptacle. Controller 44 may alternatively send the dispatch signal to an offboard dispatching center where personnel and/or computers may be able to use the dispatch signal for directing transport vehicles to and from cold planer 10.

Controller 44 may allow milling drum 26 and first conveyor 46 to continue running for a period of time while second conveyor 48 is stopped when transport vehicles 16, 18 are maneuvering around cold planer 10. For example, controller 44 may stop second conveyor 48 after first transport vehicle 16 has been filled to allow first transport vehicle 16 to depart and second transport vehicle 18 to approach cold planer 10 and prepare to receive material. During this time, milling drum 26 and first conveyor 46 may continue to run and transfer material to a buffer space associated with second conveyor 48. When second transport vehicle 18 is properly positioned (e.g., within a proper distance of conveyor 48), controller 44 may automatically restart second conveyor 48 to begin filling second transport vehicle 18. In this way, the milling process may be continuous and may avoid energy losses associated with the stopping and restarting of other components of cold planer 10.

Controller 44 may also be configured to generate commands to ensure transport vehicle 16 is properly loaded with milled material. For example, controller 44 may determine a distance between conveyor 48 and transport vehicle 16 based on the signals received from locating device 62 and/or position sensor 64, and automatically shut off conveyor 48 when the distance exceeds a threshold. That is, controller may determine distances between conveyor 48 and the lateral sides (e.g., left, right, front, back, etc.) of transport vehicle 16 based on the signals from locating device 62, position sensor 64, and/or known dimensions of transport vehicle 16 to determine when conveyor 48 is properly positioned over bed 15 of transport vehicle 16. When conveyor 48 is not properly positioned over the 15 of transport vehicle 16, controller may shut off conveyor 48 to prevent bed 15 from being improperly loaded or to prevent material spillage over the sides of transport vehicle 16.

To achieve and maintain proper positioning of conveyor 48 with respect to transport vehicle 16, controller 44 may generate commands to adjust the position of conveyor 48 with respect to transport vehicle 16 based on the signals from sensor 60, locating device 62, position sensor 64, and/or the input received from transport vehicle 16. For example, while controller 44 is determining the fill level Σ of transport vehicle 16 based on the signal from sensor 60, controller 44 may also determine the distance between conveyor 48 and transport vehicle 16 based on the signals from position sensor 64 and/or one or more of locating devices 62 and 74. Controller 44 may coordinate the signals from sensor 60 with the determined distance and known dimensions of transport vehicle 16 (e.g., received as input from transport vehicle 16) in order to track the distribution of material within bed 15 over a period of conveying time. The material distribution may include a front-to-back distribution as well as a side-to-side distribution within bed 15.

Commands to maintain proper positioning of conveyor 48 with respect to transport vehicle 16 may include commands to adjust one or more of a travel speed and a travel direction of transport vehicle 16. For example, based on the distance between conveyor 48 and transport vehicle 16, controller 44 may determine a speed and direction of travel of transport vehicle 16 that will cause milled material being discharged by conveyor 48 to land in a desired section of bed 15. That is, controller 44 may generate commands to control the speed and direction of transport vehicle 16 so that milled material may be evenly dispersed among, for example, a front section 78, a middle section 80, and a rear section 82 of bed 15. By speeding up, slowing down, and/or steering transport vehicle 16 while cold planer 10 maintains a desired course, milled material may be spread evenly among the sections 78-82 of bed 15. It is understood that bed 15 may be divided into more or fewer sections, if desired.

Commands to adjust the travel speed and direction of transport vehicle 16 from controller 44 may be communicated via communication device 66 to the operator of transport vehicle 16. For example, controller 44 of cold planer 10 may generate speed and/or directional commands and show them to the operator of transport vehicle 16 via display 76 in the operator station of transport vehicle 16. Such commands may include visible indicia (e.g., arrows, lights, numbers, letters, etc.) of a desired change to the speed and/or direction of transport vehicle 16 as commanded by controller 44. In other embodiments, audible signals may also or alternatively be generated and communicated to the operator of transport vehicle 16, if desired. In this way, controller 44 may assist the operator of transport vehicle 16 by providing clear and accurate instructions for maintaining a proper distance from conveyor 48 throughout the milling operation to ensure milled material is evenly distributed within bed 15. This assistance may also allow the operator of cold planer 10 to focus more on other aspects of the milling process and less on communicating with the operator of the transport vehicle.

Commands from controller 44 for adjusting the travel speed and direction of transport vehicle 16 may also or alternatively be communicated via communication device 66 to controller 72 for automatic control of transport vehicle 16. For example, after controller 44 establishes a communication link with transport vehicle 16, controller 44 may send a request to the operator of transport vehicle 16 via display 76 seeking control of transport vehicle during the filling process. The operator of transport vehicle 16 may accept or decline the request via an associated interface (e.g., a button, a soft key, a touch screen, etc.).

When the operator of transport vehicle accepts the request for control from controller 44 of cold planer 10, controller 44 and controller 72 may cooperate to perform parameter checks to ensure proper conditions are present for automatic control of transport vehicle 16 by cold planer 10. For example, controllers 44 and/or 72 may check to make sure transport vehicle is in a proper gear for automatic control. This may include determining whether a transmission, a transfer case, a final drive, or other gearbox or gearing device is in an appropriate or desired position. Controllers 44 and 72 may ensure transport vehicle is, for example, out of a neutral gear, in a forward gear, and in a low gear or another appropriate gear for controlling the travel speed of transport truck. Controllers 44, 72 may also check to ensure a parking brake of transport vehicle 16 is deactivated or in an off position to allow transport vehicle 16 to move in the desired direction.

Various sensors may also be checked and monitored to ensure controller 44 receives accurate data during the automatic control process. For example, controller 44 may monitor sensors on cold planer 10, such as speed sensor 58, material measurement sensor 60, locating device 62, and position sensor 64. In this way, controller 44 may be able to verify that it is receiving the needed to determine how to control transport vehicle 16 and whether such data are within respective data limits for proper automatic control. Controllers 44 and 72 may cooperate to ensure that sensors onboard transport vehicle 16 are also properly functioning. For example, locating device 74 as well as a ground speed sensors, a throttle position sensor, a steering position sensor, a service brake position sensor, and/or other sensors may be checked to ensure that data is being received from each sensor and that the data from each sensor is within a respective limit for proper automatic control.

After the request to take control of transport vehicle 16 is accepted and the parameter checks have begun or are completed, controller 44 may control the speed and travel direction of transport vehicle by controlling, for example, an accelerator 84, a service brake 86, and a steering device 88 of transport vehicle 16. Controller 44 may automatically control the positions of accelerator 84, service brake 86, and/or steering device 88 to speed up, slow down, and/or steer transport vehicle 16 to achieve proper positioning of transport vehicle 16 relative to conveyor 48. In this way, inefficient and improper loading of bed 15 caused by miscommunication between the operators of cold planer 10 and transport vehicle 16 may be reduced, and the operators may be able to direct their attention to other tasks associated with the milling operation.

As controller 44 is automatically controlling operations of transport vehicle 16, information relating to the automated control may be shown to the operator of transport vehicle 16 via display 76. For example, the positions of accelerator 84, service brake 86, steering device 88, a gear shifter, and/or other devices may be shown. For example, the positions of accelerator 84 and service brake 86 may be shown as a percent of full actuation (e.g., percent of depression, percent of maximum throttle, etc.), and the position of steering device 88 may be shown as a percent of full actuation in either a right or left direction. Other types of visual representations (e.g., sliding bars, color bars, dials, numbers, etc.) and audible representations (e.g., beeps, tones, etc.) may be used to convey speed and steering information.

When transport vehicle 16 is filled, controller 44 may send a message to the operator of transport vehicle 16 requesting to return control of transport vehicle 16 to the operator. Upon accepting the request (e.g., via an associated interface), the operator may regain full control of transport vehicle 16. At any time during automatic control of transport vehicle 16, however, the operator may manually regain control of transport vehicle 16 by manipulating any of accelerator 84, service brake 86, and steering device 88. Controller 44 may acknowledge the operator's intervention and the automatic control process may be terminated until appropriately restarted.

Commands from controller 44 to maintain proper positioning of conveyor 48 with respect to transport vehicle 16 may also or alternatively include commands to adjust the pivotal orientation of conveyor 48. For example, for a given horizontal distance between conveyor 48 and transport vehicle 16, adjusting the vertical orientation of conveyor 48 may allow milled material to be spread evenly among sections 78-82 of bed 15. When transport vehicle 16 is at least partially in front of cold planer 10, changing the vertical orientation of conveyor 48 may change the front-to-back distribution of material within bed 15. When transport vehicle 16 is at least partially offset to one side of cold planer 10, changing the vertical orientation of conveyor 48 may also change the side-to-side distribution of milled material within bed 15. Similarly, changing the horizontal orientation of conveyor 48 may also allow the side-to-side distribution (when transport vehicle 16 is in front of cold planer 10) and the front-to-back distribution (when transport vehicle 16 is offset to one side of cold planer 10) of material within bed 15 to be controlled.

Based on the distance between conveyor 48 and the sides of transport vehicle 16, controller 44 may generate commands to change the vertical and horizontal pivotal orientations of conveyor 48 and show them to the operator of cold planer 10 via display 38. Such commands may include visual indicia of desired actions (e.g., arrows, blinking lights, letters, numbers, images, etc.). In other embodiments, audible indicia may also be generated by an associated speaker or other sound-generating device. Controller 44 may also or alternatively be configured to automatically control the pivotal orientation of conveyor 48. For example, controller 44 may automatically send signals to actuators (e.g., pumps, motors, solenoids, etc.) that are configured to change the vertical and/or horizontal orientations of conveyor 48.

Controller 44 may embody a single microprocessor or multiple microprocessors that include a means for monitoring operator and sensor input, and responsively adjusting operational characteristics of cold planer 10 based on the input. For example, controller 44 may include a memory, a secondary storage device, a clock, and a processor, such as a central processing unit or any other means for accomplishing a task consistent with the present disclosure. Numerous commercially available microprocessors can be configured to perform the functions of controller 44. It should be appreciated that controller 44 could readily embody a general machine controller capable of controlling numerous other machine functions. Various other known circuits may be associated with controller 44, including signal-conditioning circuitry, communication circuitry, and other appropriate circuitry. Controller 44 may be further communicatively coupled with an external computer system, instead of or in addition to including a computer system, as desired.

INDUSTRIAL APPLICABILITY

The disclosed control system may be used with any cold planer where efficiently loading and dispatching transport vehicles is important. The disclosed control system may determine the amount of milled material being transferred into a transport vehicle and generate commands to maintain proper alignment of the transport vehicle with the cold planer based on their relative positions and the amount of material being transferred. A controller within the system may provide commands to an operator of the transport vehicle to help maintain proper alignment with the cold planer, or automatically control the speed and travel direction of the transport vehicle. The controller of the disclosed system may also provide commands to the operator of the cold planer to help maintain proper alignment of a conveyor of the cold planer with the transport vehicle, or automatically control the pivotal orientation of the conveyor to ensure proper loading and reduce material spillage. The disclosed control system may also automatically generate dispatch signals based on the amount of material being transferred into the transport vehicle. Operation of control system 56 will now be explained.

At the beginning of the milling process, cold planer 10 may establish a communication link with transport vehicle 16. When transport vehicle 16 is far from cold planer 10, controller 44 of cold planer 10 may communicate with controller 72 of transport vehicle 16 via a long-distance network, such as a cellular or satellite network, via communication devices 66, 70. At this time, controller 44 may receive some information from transport vehicle 16, such as its ID number (or other type of identifying information), its location (as determined by locating device 74), an estimated time of arrival, and a desired payload (e.g., type, amount, etc.). Other information may be shared via the long-distance network, if desired. This information may allow cold planer 10 and/or its operator to be prepared to promptly begin the milling operation upon arrival of transport vehicle 16.

When transport vehicle 16 approaches cold planer 10 a short-distance communication link may be established. For example, a Bluetooth, Wi-Fi, or other type of communication link may be established to allow greater amounts of data to be transferred with greater efficiency and lower cost when the milling operation begins. The short-distance communication link may be automatically established when transport vehicle is within a threshold distance of cold planer 10.

Controller 44 of cold planer 10 may receive additional information from transport vehicle 16 via the communication link at or near the beginning of the milling operation. For example, controller 44 may receive the volumetric capacity, geometric dimensions (e.g., length, width, height, etc.), shape or image, tare weight, weight limit $W_L$, desired payload (e.g., target fill level, weight, volume, etc.), current fill level, and/or other parameters associated with transport vehicle 16. This information may be used for further processing by controller 44 during the milling operation. Alternatively, controller 44 may have this information stored within its memory and may access it during the milling operation based on the ID number communicated by transport vehicle 16.

During the milling operation, milling drum 26 may remove a portion of surface 14 in the path of cold planer 10 as it traverses surface 14. Material removed by milling drum 26 may be transferred by first conveyor 46 to second conveyor 48, and second conveyor 48 may discharge the material into bed 15 of transport vehicle 16.

As conveyor 48 discharges material into transport vehicle 16, controller 44 may determine the amount of material being transferred into transport vehicle 16. Based on the signal from material measurement sensor 60, controller 44 may determine, for example, the mass m and/or the volume V of material on conveyor 48. In conjunction with other information, such as the signal from speed sensor 58, controller 44 may determine the mass flow rate $\dot{m}$ and/or volume flow rate $\dot{V}$ of material being transferred into transport vehicle 16 based on the determined mass m and/or volume V. Over a period of conveying time, controller 44 may also track the total weight $W_m$ of milled material transferred to transport vehicle 16 based on the mass flow rate $\dot{m}$ and and/or volume flow rate $\dot{V}$.

Controller 44 may continually determine the fill level $\Sigma$ of transport vehicle 16 as it is being filled by cold planer 10 based on one or more of the mass flow rate $\dot{m}$, volume flow rate $\dot{V}$, and total weight $W_m$ of milled material. The fill level $\Sigma$ may indicate, for example, a "percent full" of transport vehicle 16 in terms of its volumetric capacity, weight limit $W_L$, or other parameter. The volumetric capacity and weight limit $W_L$ may be communicated to controller 44 from transport vehicle 16, or they may be determined by controller 44 based on other information received from transport vehicle (e.g., geometric dimensions) 16 and/or stored within its memory. In this way, controller 44 may be able to accurately determine how much material has been transferred into transport vehicle 16, and the use of inaccurate visual estimations may be avoided.

As transport vehicle 16 is filled with milled material, the alignment of conveyor 48 with transport vehicle may be controlled to ensure that bed 15 is properly and efficiently loaded. Controller 44 may receive the signal generated by position sensor 64 and determine the position of conveyor 48 with respect to transport vehicle 16. For example, controller 44 may determine the distances between conveyor 48 and the lateral sides of transport vehicle 16 based on the signal from position sensor 64. Alternatively, controller 44 may determine the distances based on the signals from locating devices 62, 74 and known offsets. When the distance exceeds a threshold, controller 44 may automatically shut off conveyor 48 to prevent material from spilling over a side of transport vehicle. When the distance is within the threshold, controller 44 may generate command signals for controlling the position of conveyor 48 with respect to transport vehicle 16 to ensure that milled material is properly loaded into bed 15.

For example, based on a speed of cold planer 10 the distance between conveyor 48 and transport vehicle 16, controller 44 may determine a speed and travel direction of transport vehicle 16 that will cause milled material to land in a desired section 78-82 of bed 15. Controller may generate command signals for achieving the speed and travel direction and communicate them to transport vehicle 16 via communication device 66. Controller 44 may show the commands to the operator of transport vehicle 16 via display 76 to allow for manual control (e.g., via accelerator 84, service brake 86, steering device 88, etc.), or communicate them to controller 72 to allow for automatic control of the speed and travel direction of transport vehicle 16.

For example, at any time during the milling process, controller 44 or the operator of cold planer 10 may initiate automatic control of transport vehicle 16 by sending a request to the operator of transport vehicle seeking to take control. When the operator of transport vehicle 16 denies the request, operations may continue as normal with separate control of cold planer 10 and transport vehicle 16. When the operator of transport vehicle 16 accepts the request, controllers 44 and 72 may cooperate to automatically control operations of transport vehicle 16. In this way, the operators of cold planer 10 and transport vehicle 16 may be free to focus on other aspects of the milling operation while accurate speed and direction commands are communicated to transport vehicle 16.

Controller 44 and/or controller 72 may perform parameter checks to ensure proper conditions exist for automatic control of transport vehicle 16. Such parameter checks may include verifying data from sensors (e.g., sensors 58, 60, 64) and ensuring transport vehicle is in a proper non-neutral gear with the parking brake deactivated. When any parameters are determined not to be suitable, controllers 44 and 72 may request the operator of transport vehicle to make proper adjustments to allow for automatic control of transport vehicle 16 to commence. In other embodiments, controllers 44, 72 may automatically make such adjustments (e.g., changing gears, releasing the parking brake, etc.), and may do so upon acknowledgement of the operator.

During automatic control, controller 44 may automatically actuate accelerator 84, service brake 86, and steering device 86 to achieve a desired speed and position of transport vehicle 16. For example, based on the speed of cold planer 10 and distribution of material within bed 15, controller 44 may control accelerator 84 to maintain proper distancing between conveyor 48 and transport vehicle 16. Controller 44 may actuate accelerator 84 and/or service brake 86 to maintain proper positioning as cold planer 10 travels across a graded surface. For example, controller 44 may increase the percentage of accelerator displacement (e.g., increase a throttle percentage) when cold planer 10 is on an uphill grade. Controller 44 may also apply service brake 86 in order to slow transport vehicle 16 when cold planer 10 is travel across a downhill grade. Controller 44 may actuate steering device 88 in order to maneuver transport vehicle 16 around curves and corners, and/or to change the lateral distribution of milled material within bed 15. In this way, controller 44 may control the speed and/or travel direction of transport vehicle 16 in coordination with the speed and travel direction of cold planer 10 to ensure proper loading of bed 15.

Controller 44 may also generate command signals to control the vertical and/or horizontal orientation of conveyor 48 to maintain proper alignment of conveyor 48 with transport vehicle 16 during the milling operation. Based on the distance between conveyor 48 and transport vehicle 16, controller 44 may generate command signals indicative of desired vertical and/or horizontal movements of conveyor 48 and show them to the operator of cold planer 10 via display 38. In this way, the operator may be able to control the distribution of material within transport vehicle 16 with greater accuracy. Alternatively, controller 44 may direct the command signals to actuators associated with conveyor 48 to automatically control the horizontal and vertical orientation of conveyor 48. Controller 44 may coordinate automatic control of conveyor 48 with automatic control of the speed and travel direction of transport vehicle 16 to ensure accurate loading and reduce spillage over the sides of transport vehicle 16.

When the fill level $\Sigma$ of transport vehicle reaches an intermediate threshold before being fully filled, controller 44 may automatically generate a dispatch signal and communicate the signal to first and second transport vehicles 16, 18. The dispatch signal may include a request for second transport vehicle 18 to approach cold planer 10, as well as a request for first transport vehicle 16 to depart from cold planer. The dispatch signal may include an indication of the remaining time $T_F$ until transport vehicle 16 is full. Controller 44 may communicate the remaining time to $T_F$ to second transport vehicle 18 to ensure a timely arrival, and to first transport vehicle 16 to ensure a timely departure.

Controller 44 may automatically shut down second conveyor 48 when the fill level $\Sigma$ of first transport vehicle 16 reaches a threshold and is fully filled. At about this time, controller 44 may request first transport vehicle 16 to depart from cold planer 10. When automatic control of transport vehicle 16 is taking place, controller 44 may first send a request to the operator of transport vehicle 16 seeking to return full control to the operator. When the operator acknowledges the request, full control of transport vehicle 16 may be returned to the operator. However, at any time during the milling process, the operator of transport vehicle 16 may regain full control by actuating any of accelerator 84, service brake 86, and steering device 88.

When full control has been automatically or manually returned to the operator of transport vehicle 16 after bed 15 is fully filled, controller 44 may summon second transport vehicle 18 to approach cold planer 10 as transport vehicle 16 departs. While first and second transport vehicles 16, 18 are maneuvering around cold planer 10, controller 44 may allow milling drum 26 and first conveyor 46 to continue running to avoid pausing the milling process. When second transport vehicle 18 is properly positioned with respect to second conveyor 48, controller 44 may restart second conveyor 48 to begin filling second transport vehicle 18. A short-distance communication link may be established between cold planer 10 and second transport vehicle 18, and the milling operation may continue.

Several advantages may be associated with the disclosed control system. For example, because controller 44 may establish a communication link with transport vehicle 16, controller 44 may receive information about transport vehicle 16, allowing controller 44 to automatically control operations of conveyor 48 during the filling of transport vehicle 16 with milled material. Additionally, because controller 44 may determine a position of conveyor 48 with respect to transport vehicle 16, controller 44 may provide instructions to the operator of transport vehicle 16 or automatically control operations of transport vehicle 16 to achieve proper positioning and loading of transport vehicle 16 during the milling operation. Further, because controller may automatically generate dispatch signals based on the fill level $\Sigma$ of transport vehicle 16, seamless transitions between first and second transport vehicles 16, 18 may achieved, and the milling operation may be continuous.

It will be apparent to those skilled in the art that various modifications and variations can be made to the disclosed control system without departing from the scope of the disclosure. Other embodiments of the control system will be apparent to those skilled in the art from consideration of the specification and practice of the control system disclosed herein. It is intended that the specification and examples be considered as exemplary only, with a true scope of the disclosure being indicated by the following claims and their equivalents.

What is claimed is:

1. A control system for a cold planer having a conveyor configured to transfer material into a first receptacle, the control system comprising:
   a first sensor configured to generate a first signal indicative of an amount of material being transferred into the first receptacle;
   a communication device configured to transfer information between the cold planer and the first receptacle; and
   a controller electronically connected to the first sensor and the communication device and configured to:
      receive an input from the first receptacle via the communication device; and
      determine a fill level of the first receptacle based on the first signal and the input from the first receptacle.

2. The control system of claim 1, wherein the input includes one or more of a receptacle ID, receptacle dimensions, and a target fill level.

3. The control system of claim 1, wherein the controller is further configured to determine an amount of time until the fill level of the first receptacle reaches a threshold based on the first signal.

4. The control system of claim 3, wherein:
   the communication device is further configured to transfer data between the cold planer and a second receptacle; and
   the controller is further configured to communicate the amount of time until the fill level of the first receptacle reaches the threshold to the second receptacle via the communication device.

5. The control system of claim 4, wherein the controller is configured to generate a dispatch signal when the fill level of the first receptacle exceeds a threshold.

6. The control system of claim 1, wherein the control system further includes a second sensor in electronic communication with the controller and configured to generate a second signal indicative of a position of the conveyor with respect to the first receptacle.

7. The control system of claim 6, wherein the controller is configured to determine a distance between the conveyor and the first receptacle based on the second signal, and automatically shut off the conveyor when the distance exceeds a threshold or when the fill level of the first receptacle exceeds a threshold.

8. The control system of claim 6, wherein the controller is further configured to generate a command to adjust the position of the conveyor with respect to the first receptacle based on the second signal.

9. The control system of claim 8, wherein:
   the first receptacle includes a controller configured to control operations of the first receptacle; and
   the controller of the cold planer is configured to communicate the command to the controller of the first receptacle via the communication device, wherein the command is a command to automatically adjust at least one of a travel speed and a travel direction of the first receptacle.

10. The control system of claim 8, wherein:
    the first receptacle includes a display in electronic communication with the controller of the cold planer via the communication device; and
    the controller of the cold planer is configured to show the command to an operator of the first receptacle via the display.

11. The control system of claim 8, wherein:
    the conveyor is pivotally connected to the cold planer; and
    the controller is configured to automatically adjust a pivotal orientation of the conveyor based on the command.

12. A method of operating a cold planer system, comprising:
    transferring material into a first receptacle via a conveyor;
    determining an amount of material being transferred into the first receptacle based at least in part on signals from a sensor on the cold planer;
    receiving at a controller that is in communication with both the cold planer and the first receptacle, an input from the first receptacle; and
    determining at the controller a fill level of the first receptacle based on the signals and the input from the first receptacle.

13. The method of claim 12, wherein the input includes one or more of a receptacle ID, receptacle dimensions, and a target fill level.

14. The method of claim 12, further including:
    determining an amount of time until the fill level of the first receptacle reaches a threshold based on the amount of material being transferred into the first receptacle; and
    communicating the amount of time to a second receptacle.

15. The method of claim 14, further including generating a dispatch signal when the fill level of the first receptacle exceeds a threshold.

16. The method of claim 12, further including:
    determining a distance between the conveyor and the first receptacle; and
    automatically shutting off the conveyor when the distance between the conveyor and the first receptacle exceeds a threshold or when the fill level of the first receptacle exceeds a threshold.

17. The method of claim 12, further including:
    determining a distance between the conveyor and the first receptacle; and
    generating a command to adjust at least one of a travel speed and a travel direction of the first receptacle based on the distance.

18. The method of claim 17, wherein the method further includes one of showing the command to an operator of the first receptacle via a display, and automatically adjusting at least one of the travel speed and the travel direction of the first receptacle based on the command.

19. The method of claim 17, wherein:
    the conveyor is pivotally connected to the cold planer; and
    the method further includes automatically adjusting a pivotal orientation of the conveyor based on the command.

20. A cold planer, comprising:
    a frame;
    a milling drum connected to the frame;
    a conveyor pivotally connected to the frame and configured to load milled material into a first receptacle;
    a first sensor configured to generate a first signal indicative of an amount of material being transferred into the first receptacle;
    a second sensor configured to generate a second signal indicative of a position of the conveyor with respect to the first receptacle a communication device configured to transfer information between the cold planer and the first receptacle and between the cold planer and a second receptacle; and a controller electronically connected to the first sensor, the second sensor, and the communication device and configured to:

receive an input from the first receptacle via the communication device;

generate a command to adjust the position of the conveyor with respect to the first receptacle based on the first and second signals and the input from the first receptacle;

determine a fill level of the first receptacle based on the first signal and the input from the first receptacle; and generate a dispatch signal when the fill level of the first receptacle exceeds a threshold.

* * * * *